C. H. PALMER.
BOBBIN WINDER FOR SEWING MACHINES.
No. 4,576. Reissued Oct. 3, 1871.
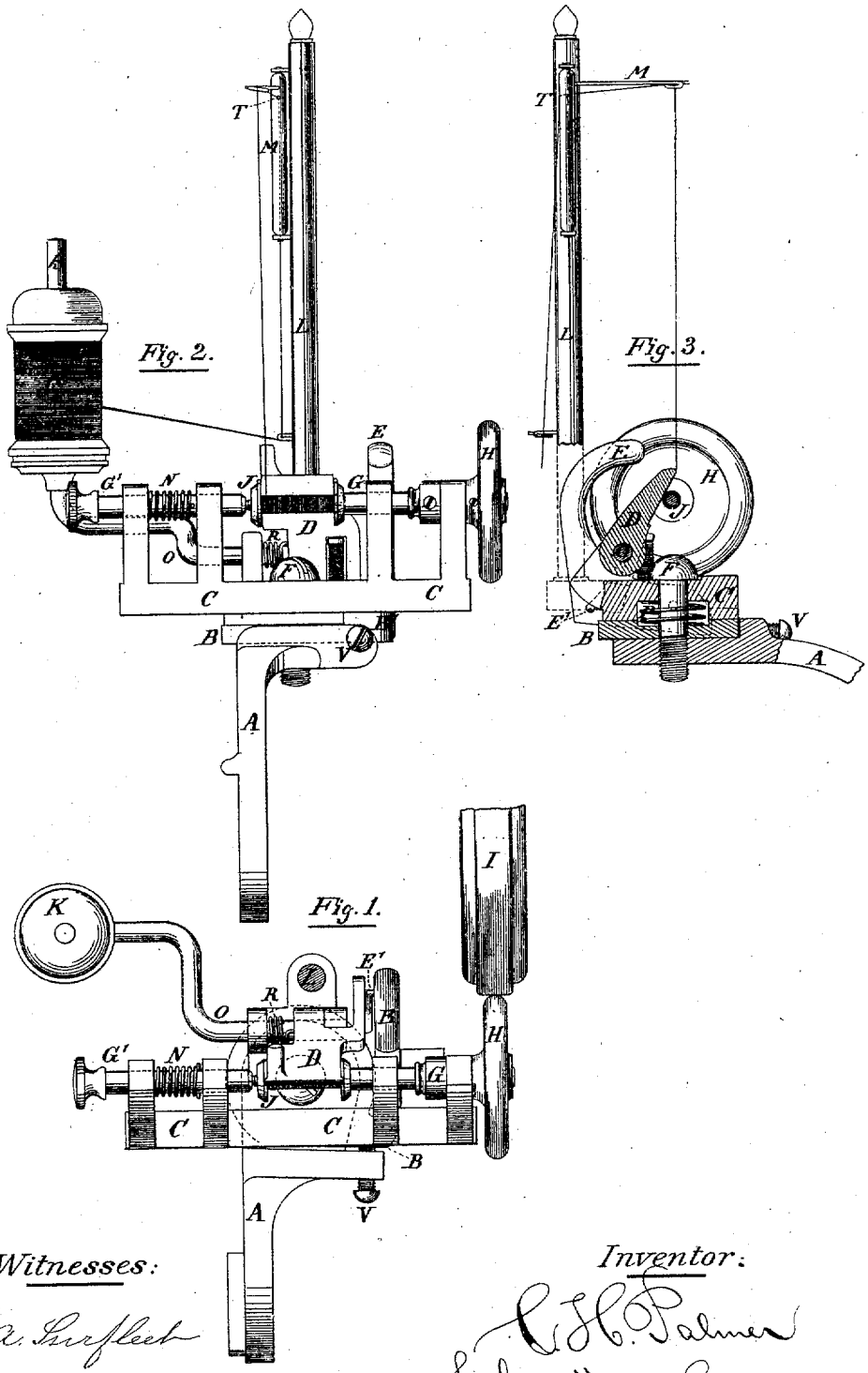
Witnesses:
J. A. Surfleet
A. Hoermann
Inventor:
C. H. Palmer
By his attys
E. G. Siebrecht

UNITED STATES PATENT OFFICE.

CHARLES H. PALMER, OF NEW YORK, N. Y., ASSIGNOR TO THE PALMER AUTOMATIC BOBBIN-WINDER COMPANY.

IMPROVEMENT IN BOBBIN-WINDERS FOR SEWING-MACHINES.

Specification forming part of Letters Patent No. 105,363, dated July 12, 1870; reissue No. 4,576, dated October 3, 1871.

*To all whom it may concern:*

Be it known that I, CHARLES H. PALMER, of the city, county, and State of New York, have invented a new and Improved Automatic Bobbin-Winder for Sewing-Machines.

I have combined in a portable device, suitable for attachment to a sewing-machine, devices which have been before employed separately in other machinery, and have provided novel means of throwing it into and out of operation.

The following is a description of what I consider the best means of carrying out the invention in all its several parts. The accompanying drawing forms a part of this specification.

Figure 1 is a plan view, partly in section, showing the entire lower portion of the bobbin-winder ready for attachment to a sewing-machine. Fig. 2 is a front elevation. Fig. 3 is a cross-section as seen at the left.

Similar letters refer to like parts in all the figures.

A is the bracket by which the mechanism is supported, and which, it will be understood, is fixed to a sewing-machine table, not represented. B is a plate or abutment-piece, seen in edge view in Fig. 2, in section in Fig. 3, and represented by dotted lines in Fig. 1, adapted to be adjusted to a limited extent on a central screw, F. It has a projection or arm, $B^1$, against which the set-screw V acts for the purpose of regulating the extent of motion of a frame, C, mounted above, on which the winding mechanism is carried. The frame C is made to turn freely upon the screw swivel-pin F. P is a coiled spring resting in a recess made in the upper side of B, and tending to turn the frame C upon the swivel F in such a manner as to relieve the friction-wheel H from contact with the driving-wheel I. D is an automatic pressure-lever fixed to the oscillating shaft O. The same shaft, extended and properly bent to form an upright spool-holder, *k*, supports the large bobbin or spool K which furnishes the thread. R is a spiral spring, one end of which bears on the frame C, and the other end acts against the pressure-lever D in such a manner as to cause D to press upon the bobbin J or upon the thread thereon with a nearly constant force, whether the bobbin be empty or full. E is a cam trip-lever, constructed with a spur, E′, on its heel adapted to enter a nick in the heel of the pressure-lever D, as seen in Figs. 1 and 3. G is a shaft or spindle, by which, with the aid of the non-turning-piece G′ and its actuating-spring N, the small bobbin J to be filled is supported and allowed to be introduced and removed. H is a friction-wheel fixed on a spindle, G, and adapted to be pressed, when desired, against the driving-wheel I of the sewing-machine to receive therefrom a rapid rotatory motion. On the spring-piece G′ is a conical socket, into which fits the conical point on the end of the bobbin J. On the shaft G are four small points or pins projecting, as seen in Fig. 2, which little pins enter a like number of holes surrounding a cone-like central projection on the end of the bobbin J and compel the bobbin to turn with it. N is a spiral spring, which holds the spring piece G′ up against the bobbin J with sufficient pressure, but allows it to be readily drawn back to remove the full bobbin and introduce and employ another one. L is an upright, on which a freely-swinging and practically-frictionless arm, M, is supported, through which latter the thread is conducted, as shown. The thread from the spool K, after passing through one or more eyes or guides, is led through an eye, T, which is exactly in line with the center or axis of the arm M, so that, however its draft may be increased by inducing friction on the spool K or otherwise, the arm or frictionless crane M will still be as free to swing as before, except that it will, of course, be subject to increased resistance from the slight friction. The arm M swings freely to and fro over the bobbin like a crane, with nice precision, its motions being wholly dependent upon the lead or draft of the thread, which slips gradually from side to side, due to the guiding of the thread against itself as it is being wound upon the bobbin.

The bobbin J and thread being adjusted, the cam trip-lever E is pressed back with the finger until the spur E′ catches in the nick in the heel of the pressure-lever D. In thus adjusting the lever E the adjustable frame C is made to turn upon its center by virtue of the cam end of E pressing on the arm B′ of disk B. This movement brings the friction-wheel H in contact with the driving-wheel I of the sewing-machine and commences to revolve the winding mechanism and draw off thread from the spool K, while the spiral spring R presses lever D against bobbin J, and as the thread begins to wind the leading arm M begins to move back and forth with nice regularity, being regulated in its motions only by the contact of each coil of the thread against the one preceding. After the bobbin J has received one layer of coils the thread rides up necessarily upon the last and commences to fill across in the reverse direction. As the bobbin gradually fills the thread lifts the pressure-lever D, and the parts are so proportioned that at the moment the bobbin J is filled the lever D has been lifted so as to let spur E′ slip from its nick in the lever D, and instantly the adjustable frame C is thrown back by coiled spring P to its original position, thus removing friction-wheel H from contact with driving-wheel I. It follows that the winding is automatically arrested at the right point, and the full bobbin J may be now removed and an empty one supplied and the operation repeated.

Some of the advantages due to certain features of the invention may be separately enumerated as follows: First, by reason of the employment of my turning-frame C under piece B and spring P, as specified, I am able to insure that the friction-wheel H shall be out of contact with the main wheel I, and consequently that my bobbin-carrier G G′ and all the parts of my device shall be inoperative, except when specially adjusted for use and held in such adjustment by some device for the purpose. Second, by reason of my cam trip-lever E E′, arranged as represented relatively to the pressure-lever D, and to the turning-frame with its spring P and the mechanism for carrying the bobbin J and guiding the thread thereon, as shown, I am able to not only fill the bobbin evenly and smoothly, but also to stop the operation automatically so soon as it is filled. Third, by reason of my adjusting-screw V and movable base piece or abutment piece B B′, arranged to serve, as represented, relatively to the other parts, I am able to compensate for the gradual wearing away of the rubber at the edge of the friction-wheel H, or to allow for accidental differences of diameter due to imperfect workmanship or other cause, and to use the device on different sewing-machines from that for which it was previously adjusted, with great facility of adaptation and perfection of operation.

What I claim as my invention is—

1. The turning-frame C, the abutment piece B B′, and spring P, arranged for joint operation in connection with the friction-wheel H and suitable devices for engaging the bobbin-winding mechanism with the driving-wheel of the machine and for releasing it therefrom, as herein specified.

2. The combination of the trip-lever E E′ with the movable frame C, the disk B, the pressure-lever D, and spring P, all constructed substantially as described, and operating to hold the wheel H in contact with the driving-wheel of a sewing-machine for winding bobbins, and to automatically release them from contact with each other when the bobbin is full, as specified.

3. The combination, with the movable frame C and disk B B′, of the adjusting set-screw V, which regulates the extent of horizontal rotatory motion of the frame C, as described.

CHARLES H. PALMER.

Concurred in by The Palmer Automatic Bobbin-Winder Company.

JOHN N. HAYWARD, *Pres.*
THEOPHILUS PRATT, *Sec.*

Witnesses:
A. B. KETCHAM,
JOHN C. FRASER.

(97)